(12) United States Patent
Ang et al.

(10) Patent No.: US 12,531,225 B2
(45) Date of Patent: Jan. 20, 2026

(54) OVERFLOW SENSOR FOR OPEN PORT SAMPLING PROBE

(71) Applicant: DH TECHNOLOGIES DEVELOPMENT PTE. LTD., Singapore (SG)

(72) Inventors: Wan Ee Ang, Singapore (SG); Wayne Wei Kang Sng, Singapore (SG)

(73) Assignee: DH Technologies Development Pte. Ltd., Singapore (SG)

( * ) Notice: Subject to any disclaimer, the term of this patent is extended or adjusted under 35 U.S.C. 154(b) by 431 days.

(21) Appl. No.: 17/999,617

(22) PCT Filed: May 22, 2021

(86) PCT No.: PCT/IB2021/054457
§ 371 (c)(1),
(2) Date: Nov. 22, 2022

(87) PCT Pub. No.: WO2021/234674
PCT Pub. Date: Nov. 25, 2021

(65) Prior Publication Data
US 2023/0207297 A1    Jun. 29, 2023

Related U.S. Application Data

(60) Provisional application No. 63/029,216, filed on May 22, 2020.

(51) Int. Cl.
| H01J 49/04 | (2006.01) |
| H01J 49/02 | (2006.01) |
| H01J 49/16 | (2006.01) |

(52) U.S. Cl.
CPC ......... H01J 49/044 (2013.01); H01J 49/025 (2013.01); H01J 49/167 (2013.01)

(58) Field of Classification Search
None
See application file for complete search history.

(56) References Cited

U.S. PATENT DOCUMENTS

| 5,208,458 A | 5/1993 | Busch |
| 5,691,205 A | 11/1997 | Kawabata et al. |
(Continued)

FOREIGN PATENT DOCUMENTS

| GB | 2520389 A | * | 5/2015 | ......... G01N 30/7266 |
| KR | 20160099376 A | | 8/2016 | |
(Continued)

OTHER PUBLICATIONS

Kommireddy, et al., "Layer-by-Layer Assembly of TiO2 Nanoparticles for Stable Hydrophilic Biocompatible Coatings", Journal of Nanoscience and Nanotechnology, American Sci Pub., US, vol. 5, No. 7, Jul. 1, 2005, pp. 1081-1087.
(Continued)

Primary Examiner — David E Smith
Assistant Examiner — Alina Kaliszewski
(74) Attorney, Agent, or Firm — Merchant & Gould P.C.

(57) ABSTRACT

In a sampling interface for mass spectrometry, a method and apparatus are set forth for preventing liquid overflow from a sampling probe into a sample. The apparatus comprises a substrate adapted to retain a droplet of liquid as it forms at an open end of the sampling probe, and a sensor on a surface of the substrate opposite the sample adapted to detect the droplet of liquid and generate a signal for controlling the droplet of liquid before it overflows into the sample.

13 Claims, 5 Drawing Sheets

(56) References Cited

U.S. PATENT DOCUMENTS

| | | | |
|---|---|---|---|
| 6,235,471 B1* | 5/2001 | Knapp | G01N 27/44791 |
| | | | 435/7.1 |
| 7,070,260 B2 | 7/2006 | Mutz et al. | |
| 7,923,681 B2 | 4/2011 | Collins et al. | |
| 8,147,665 B2 | 4/2012 | Livache et al. | |
| 8,637,813 B2 | 1/2014 | Van Berkel | |
| 8,741,149 B2 | 6/2014 | Hughes | |
| 9,779,926 B2 | 10/2017 | Van Berkel | |
| 10,115,577 B1 | 10/2018 | Eiler | |
| 10,151,727 B2 | 12/2018 | Kawabata et al. | |
| 10,770,277 B2 | 9/2020 | Datwani et al. | |
| 10,998,179 B2 | 5/2021 | Arnold et al. | |
| 11,476,106 B2 | 10/2022 | Arnold et al. | |
| 11,817,302 B2 | 11/2023 | Arnold et al. | |
| 2001/0049148 A1* | 12/2001 | Wolk | G01N 21/6452 |
| | | | 204/453 |
| 2002/0150926 A1 | 10/2002 | Jindal | |
| 2003/0193020 A1 | 10/2003 | Van Berkel | |
| 2006/0169030 A1 | 8/2006 | Stewart | |
| 2009/0166525 A1 | 7/2009 | Hughes | |
| 2009/0193880 A1 | 8/2009 | Van Berkel | |
| 2009/0309020 A1 | 12/2009 | Cooks | |
| 2010/0224013 A1 | 9/2010 | Van Berkel | |
| 2010/0237235 A1* | 9/2010 | Ozbal | G01N 30/7266 |
| | | | 250/288 |
| 2011/0133077 A1 | 6/2011 | Henion | |
| 2011/0220784 A1 | 9/2011 | Roach | |
| 2012/0053065 A1 | 3/2012 | Van Berkel | |
| 2012/0079894 A1 | 4/2012 | Van Berkel | |
| 2013/0043380 A1 | 2/2013 | Correale | |
| 2013/0048851 A1 | 2/2013 | Kumano | |
| 2013/0294971 A1 | 11/2013 | Van Berkel et al. | |
| 2014/0117221 A1 | 5/2014 | Schneider | |
| 2014/0216177 A1 | 8/2014 | Van Berkel et al. | |
| 2014/0312219 A1* | 10/2014 | Ardelt | H01J 49/322 |
| | | | 250/282 |
| 2014/0326872 A1 | 11/2014 | Van Berkel | |
| 2016/0049065 A1 | 2/2016 | Lu et al. | |
| 2018/0158661 A1 | 6/2018 | Eberlin | |
| 2018/0269047 A1 | 9/2018 | Zhu | |
| 2019/0049415 A1* | 2/2019 | Pawliszyn | G01N 1/405 |
| 2019/0157061 A1* | 5/2019 | Datwani | B01L 3/0268 |
| 2020/0043712 A1* | 2/2020 | Arnold | H01J 49/0495 |
| 2022/0341838 A1 | 10/2022 | Ghazi | |
| 2023/0197428 A1 | 6/2023 | Covey | |

FOREIGN PATENT DOCUMENTS

| | | | |
|---|---|---|---|
| WO | 00/25923 | 5/2000 | |
| WO | 2015/019159 | 2/2015 | |
| WO | WO-2015040391 A1 * | 3/2015 | H01J 49/0422 |
| WO | 2015/188282 | 12/2015 | |
| WO | 2021/035244 | 2/2021 | |
| WO | WO-2021035244 A1 * | 2/2021 | G01N 15/1404 |
| WO | 2021/234674 | 11/2021 | |

OTHER PUBLICATIONS

Li, Anyin et al., "Robotic Surface Analysis Mass Spectometry (RoSA-MS) of Three-Dimensional Objects", Analytical Chemistry, vol. 90, No. 6, Mar. 1, 2018, pp. 3981-3986.

Liu, Chang et al., "Fluid Dynamics of the Open Port Interface for High-Speed nanoliter Volume Sampling Mass Spectrometry", Analytical Chemistry, vol. 93, No. 24, Jun. 10, 2021, pp. 8559-8567.

Tsougeni, K. et al., "Mechanisms of oxygen plasma nanotexturing of organic polymer surfaces; From stable super hydrophilic to super hydrophobic surfaces", Langmuir, American Chemical Society, US, vol. 25, No. 19, Oct. 6, 2009, pp. 11748-11759.

Hager, James et al., "Product ion scanning using a Q-Q-Qlinear ion trap (Q TRAP) mass spectrometer", Rapid Communications in Mass Spectometry (2003; 17: 1056-1064).

PCT International Search Report and Written Opinion in International Application PCT/IB2021/054457, mailed Oct. 12, 2021, 12 pages.

PCT International Preliminary Report on Patentability in International Application PCT/IB2021/054457, mailed Nov. 17, 2022, 10 pages.

Zhang Hui et al., "Acoustic Ejection Mass Spectometry for Hugh-Throughput Analysis", bioRxiv, Jan. 29, 2020, 32 pages.

Van Berkel et al., "An open port sampling interface for liquid introduction atmospheric pressure ionization mass spectometry: Open port sampling interface", Rapid Communications in Mass Spectrometry, vol. 29, No. 19, Oct. 15, 2015, pp. 1749-1756.

Vas, Gyorgy et al., "Solid-phase microextraction: a powerful sample preparation tool prior to mass spectrometric analysis", Journal of Mass Spectrometry, vol. 39, No. 3, Mar. 2, 2004, pp. 233-254.

* cited by examiner

OVERFLOW SENSOR FOR OPEN PORT SAMPLING PROBE

RELATED US APPLICATION CROSS-REFERENCE TO RELATED CASES

This application is a National Stage Application of PCT International Patent Application No. PCT/IB2021/054457, filed on May 22, 2021, which claims the benefit of priority to U.S. Provisional Application No. 63/029,216, filed on May 22, 2020, the contents of which are incorporated herein by reference in their entireties. To the extent appropriate, a claim of priority is made to each of the above disclosed applications.

FIELD

The present invention relates to sampling interfaces for mass spectrometry systems, and more particularly to a method and apparatus for preventing liquid overflow from an open port sampling probe into a sample.

BACKGROUND

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of the analyte of interest. Such pre-analytical steps can include sampling (i.e., sample collection) and sample preparation (separation from the matrix, concentration, fractionation and, if necessary, derivatization). It has been estimated, for example, that more than 80% of the time of overall analytical process can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation and sample introduction techniques for MS should be fast, reliable, reproducible, inexpensive, and in some aspects, amenable to automation. By way of example, various ionization methods have been developed that can desorb/ionize analytes from condensed-phase samples with minimal sample handling. One example of an improved sample introduction technique is a sampling probe, such as an "open port" sampling interface (OPI) in which relatively unprocessed samples can be introduced into a continuous flowing solvent that is delivered to an ion source of a MS system, as described for example in an article entitled "An open port sampling interface for liquid introduction atmospheric pressure ionization mass spectrometry" of Van Berkel et al., published in *Rapid Communications in Mass Spectrometry*, 29(19), pp. 1749-1756 (2015), which is incorporated by reference in its entirety.

In the event of insufficient aspiration, a drop of solvent may accumulate at the open end of the sampling probe. The surface tension of the solvent causes the drop to hang from the bottom of the sampling probe, forming a pendant. When the drop exceeds a certain weight, it is no longer stable and detaches itself and falls under gravitational force into the samples below, causing contamination.

SUMMARY

It is an aspect of the present invention to provide an improved method and apparatus for preventing liquid overflow from a sampling probe into a sample.

The above aspect can be attained by an apparatus for preventing liquid overflow from a sampling probe into a sample, comprising a substrate adapted to retain a droplet of liquid as it forms at an open end of the sampling probe, and a sensor on a surface of the substrate opposite the sample, adapted to detect the retained droplet of liquid and generate a signal to control the droplet of liquid before it overflows into the sample.

In some aspects, the controlling the droplet of liquid may comprise halting a supply of liquid to the sampling probe. In some aspects, the controlling the droplet of liquid may comprise increasing aspiration at the sampling probe to aspirate the droplet of liquid from the substrate to flow the liquid to the sampling probe. In some aspects, the controlling the droplet of liquid may comprise reducing a supply of liquid to the sampling probe. In some aspects, the controlling comprise a combination of increasing aspiration of liquid from the sampling probe and reducing or halting the supply of liquid to the sampling probe.

In some aspects, the apparatus may further be operative to increase suction applied to the sampling probe to aspirate the retained droplet of liquid from the substrate.

In an embodiment, the substrate includes an orifice adapted to accumulate and retain the droplet under tension as it grows from a surface of the substrate facing the sample (e.g. bottom or lower surface) toward the surface of the substrate opposite the sample (e.g. upper or top surface), whereupon the droplet comes into contact with the sensor for detection thereby.

In embodiments, the sensor is one of either an electrically conductive trace, a conductive wire on the surface of the substrate opposite the sample or a temperature sensor on the surface of the substrate opposite the sample.

In a further embodiment, the temperature sensor is one of either a thermocouple or a resistance thermometer.

In some embodiments, an apparatus for preventing liquid overflow from a sampling probe into a sample is provided. The apparatus comprising a substrate adapted to retain a droplet of liquid as it forms at an open end of the sampling probe, and a sensor on a surface of the substrate opposite the sample, adapted to detect the retained droplet of liquid and generate a signal to control the droplet of liquid before it overflows into the sample. The substrate may include an orifice adapted to accumulate and retain the droplet under tension as it grows from a surface of the substrate facing the sample (e.g. bottom or lower surface) toward the surface of the substrate opposite the sample (e.g. upper or top surface), whereupon the droplet comes into contact with the sensor for detection thereby. In some aspects, the substrate may be positioned to locate the sampling probe within the orifice and position an open end of the sampling probe between the sensor and the sample. In these embodiments, portions of sample ejected from the sample travel from the sample to the open end without passing the sensor on the substrate.

In another aspect, a method is set forth for preventing liquid overflow from a sampling probe into a sample, comprising retaining a droplet of liquid as it forms at the open end of the sampling probe, detecting the retained droplet of liquid, and generating a signal to control the droplet of liquid before it overflows into the sample.

In an embodiment, the retained droplet of liquid is detected on a substrate surface opposite the sample (e.g. upper or top surface).

In another embodiment, retaining a droplet of liquid includes accumulating the droplet under tension as it grows from a substrate surface facing the sample (e.g. lower or bottom surface) toward the substrate surface opposite the sample.

In a further embodiment, a notification signal can be generated indicating an overflow condition.

In a further embodiment, the controlling the droplet of liquid comprises increasing a suction applied to the sampling probe to aspirate the retained droplet from the substrate. In some aspects, the increasing the suction comprises increasing a nebulizing gas flow rate of an ion source receiving the liquid from the sampling probe.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

Figure 1:
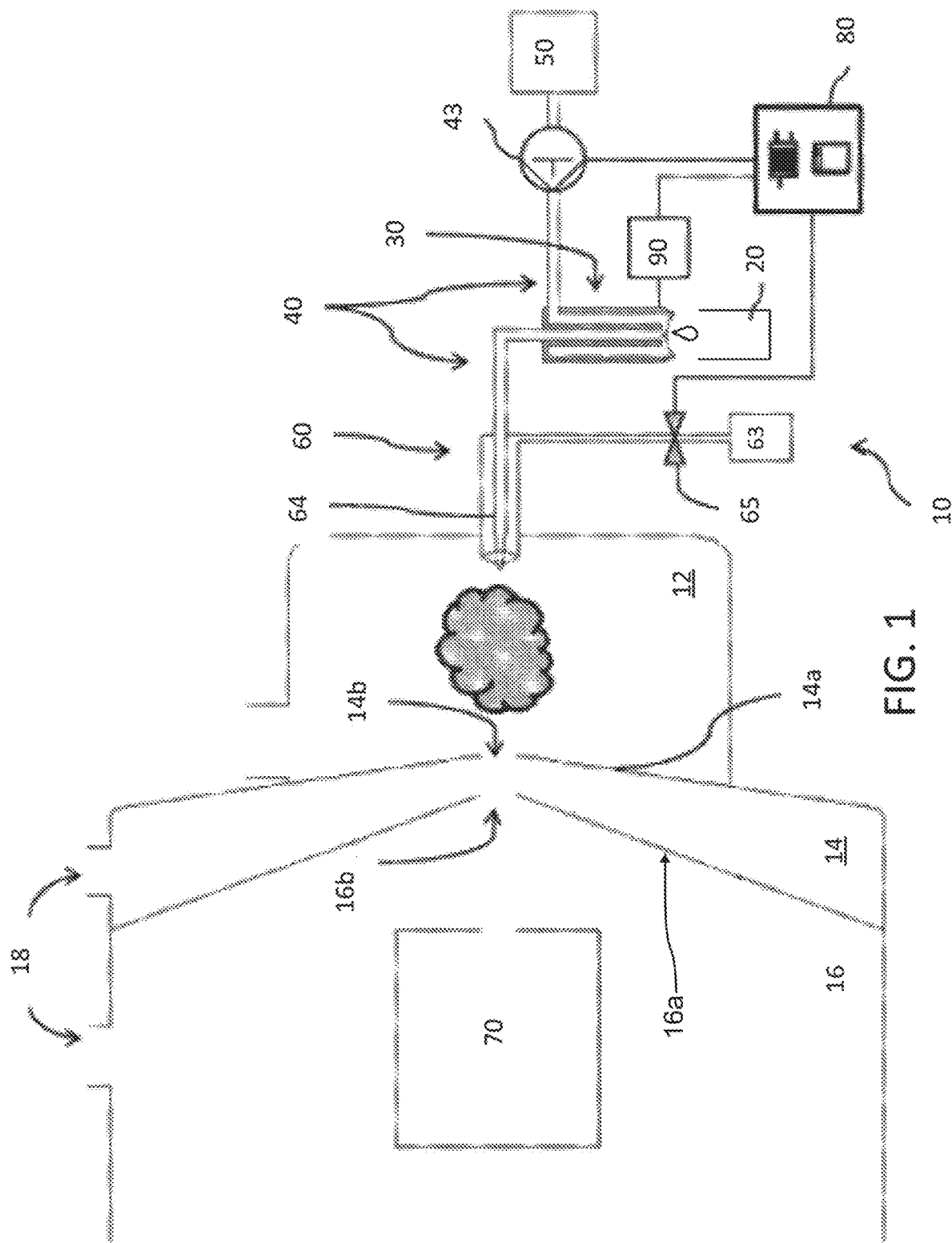
FIG. 1, in a schematic diagram, depicts an embodiment of an exemplary system in accordance with various aspects of the applicant's teachings for preventing liquid overflow from an open port sampling probe into a sample in a MS system.

FIG. 1 schematically depicts an embodiment of an exemplary system 10 in accordance with various aspects of the applicant's teachings for ionizing and mass analyzing analytes received within an open end of a sampling probe 30. According to an aspect, the system 10 includes a feedback-based control system configured to preventing liquid overflow from sampling probe 30 into a sample 20. As shown in FIG. 1, a sampling probe 30 (e.g., an open-port sampling interface (OPI)) is in fluid communication with a nebulizer-assisted ion source 60 for discharging a liquid containing one or more sample analytes (e.g., via electrospray electrode 64) into an ionization chamber 12, and a mass analyzer 70 in fluid communication with the ionization chamber 12 for downstream processing and/or detection of ions generated by the ion source 60. A fluid handling system 40 (e.g., including one or more pumps 43 and one or more conduits) provides for the flow of liquid from a reservoir 50 to the sampling probe 30 and from the sampling probe 30 to the ion source 60. For example, as shown in FIG. 1, the reservoir 50 (e.g., containing a liquid, such as a desorption solvent (e.g. methanol)) can be fluidly coupled to the sampling probe 30 via a supply conduit through which the liquid can be delivered at a selected volumetric rate by the pump 43 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example.

As discussed in detail below, flow of liquid into and out of the sampling probe 30 occurs within a sample space accessible at the open end such that one or more analytes can be introduced into the liquid within the sample space and subsequently delivered to the ion source 60. In accordance with an aspect of Applicant's teachings, the system 10 includes an apparatus 90 for detecting droplets of liquid as they form at the open end of the sampling probe 30 and a controller 80 operatively coupled thereto so as to receive a signal indicative of droplet formation and in response to control the droplet of liquid before it overflows into the sample 20. In some embodiments, the droplet of liquid may be controlled by reducing or halting supply of liquid to the sampling probe 30 while maintaining aspiration to draw the droplet of liquid into the sampling probe 30. In some aspects, the droplet of liquid may be controlled by increasing aspiration to aspirate the droplet of liquid into the sampling probe 30. In some aspects, a combination of increasing aspiration and reducing or halting supply of liquid to the sampling probe 30 may be used to control the droplet of liquid.

In accordance with various aspects of the present teachings, the control signals generated by the controller 80 can reduce or halt liquid flow to the sampling probe 30 by controlling operation of the pump 43 and/or increase aspiration by controlling operation of the nebulizer gas source 63 supplying nebulizer gas to the outlet end of the electrospray electrode 64, by way of non-limiting example. In embodiments, the controller 80 can also generate a notification signal (e.g. audible and/or visual alarm) to notify a human operator of an overflow condition.

It will be appreciated that the controller 80 can be implemented in a variety of manners in accordance with the present teachings, but generally comprises one or more processors configured to generate control signals for controlling the operations of the elements of the system 10 as otherwise discussed herein. By way of non-limiting example, the controller 80 can be in the form of a digital controller configured to process (e.g., via an algorithm) the signal provided by apparatus 90 and control operation of the pump 43 and/or the nebulizer gas source 63 to reduce or halt liquid flow in the sampling probe 30 and/or halt operation of the nebulizer gas source 63 and/or increase the supply of nebulizing gas from the nebulizer gas source 63. In accordance with certain aspects of the present teachings, the controller can comprise a digital processor executing one or more sequences of instructions contained in memory, which may be read into memory from another computer-readable medium (e.g., a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read). Execution of the sequences of instructions contained in memory causes processor to perform the process described herein. Alternatively, hard-wired circuitry may be used in place of or in combination with software instructions to implement the present teachings. Thus, implementations of the present teachings are not limited to any specific combination of hardware circuitry and software. In various embodiments, the controller 80 can be connected to one or more other computer systems across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

With continued reference to FIG. 1, the ion source 60 can have a variety of configurations but is generally configured to generate analytes contained within a liquid (e.g., the desorption solvent) that is received from the sampling probe 30. In the exemplary embodiment depicted in FIG. 1, an electrospray electrode 64, which can comprise a capillary that is fluidly coupled to the sampling probe 30, terminates in an outlet end that at least partially extends into the ionization chamber 12 and discharges the desorption solvent therein. As will be appreciated by a person skilled in the art in light of the present teachings, the outlet end of the electrospray electrode 64 can atomize, aerosolize, nebulize, or otherwise discharge (e.g., spray with a nozzle) the desorption solvent into the ionization chamber 12 to form a sample plume comprising a plurality of micro-droplets generally directed toward (e.g., in the vicinity of) the curtain plate aperture 14b and vacuum chamber sampling orifice 16b. As is known in the art, analytes contained within the micro-droplets can be ionized (i.e., charged) by the ion source 60, for example, as the sample plume is generated. By way of non-limiting example, the outlet of the electrospray electrode 64 can be made of a conductive material and electrically coupled to a pole of a voltage source (not shown), while the other pole of the voltage source can be grounded. Micro-droplets contained within the sample plume can thus be charged by the voltage applied to the outlet end such that as the liquid or desorption solvent within the droplets evaporates during desolvation in the ionization chamber 12 such bare charged analyte ions are released and drawn toward and through the apertures 14b, 16b and focused (e.g., via one or more ion lens) into the mass analyzer 70. Though the ion source probe is generally described herein as an electrospray electrode 64, it should be appreciated that any number of different ionization techniques known in the art for ionizing liquid samples and modified in accordance with the present teachings can be utilized as the ion source 60. By way of non-limiting example, the ion source 60 can be an electrospray ionization device, a nebulizer assisted electrospray device, a chemical ionization device, a nebulizer assisted atomization device, a photoionization device, a laser ionization device, a thermospray ionization device, or a sonic spray ionization device.

As shown in FIG. 1, the exemplary ion source 60 can optionally include a source 63 of pressurized gas (e. g. nitrogen, air, or noble gas) that supplies a high velocity nebulizing gas flow which surrounds the outlet end of the electrospray electrode 64 and interacts with the liquid discharged therefrom to enhance the formation of the sample plume and the ion release within the plume for sampling by 14b and 16b, e.g., via the interaction of the high speed nebulizing flow and jet of liquid sample. The nebulizer gas can be supplied at a variety of flow rates, for example, in a range from about 0.1 L/min to about 20 L/min, which can also be controlled under the influence of controller 80 (e.g., via opening and/or closing valve 65). In accordance with various aspects of the present teachings, it will be appreciated that the flow rate of the nebulizer gas can be adjusted (e.g., under the influence of controller 80) such that the flow rate of liquid drawn from the sampling probe 30 can be adjusted based, for example, on suction/aspiration force generated by the interaction of the nebulizer gas and the desorption solvent as it is being discharged from the electrospray electrode 64 (e.g., due to the Venturi effect). In this manner, the controller 80 can additionally or alternatively control the flow rate of the desorption solvent drawn from the sampling probe 30 by adjusting one or more of a pump and/or valve 65 for controlling the pressure or flow rate of the nebulizer gas. By way of non-limiting example, the controller 80 can be configured to maintain the supplied flow rate of liquid provided by the pump 43 as substantially constant, while accounting for changes in experimental conditions (e.g., temperature effects, instability of the pump 43, changes of solvent/sample composition, for example, resulting in changes in solvent/sample viscosity, introduction rate/volume of liquid samples into the sample space) by adjusting the flow of nebulizer gas provided from the nebulizer source 63 to thereby adjust the flow of liquid drawn from the sampling probe 30.

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes desorbed from the sample 20 can be ionized as the desorption solvent is discharged from the electrospray electrode 64, is separated from a gas curtain chamber 14 by a plate 14a having a curtain plate aperture 14b. As shown, a vacuum chamber 16, which houses the mass analyzer 70, is separated from the curtain chamber 14 by a plate 16a having a vacuum chamber sampling orifice 16b. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

It will also be appreciated by a person skilled in the art and in light of the teachings herein that the mass analyzer 70 can have a variety of configurations. Generally, the mass analyzer 70 is configured to process (e.g., filter, sort, dissociate, detect, etc.) sample ions generated by the ion source 60. By way of non-limiting example, the mass analyzer 70 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-Qlinear ion trap (Q TRAP®) mass spectrometer," authored by James W. Hager and J. C. Yves LeBlanc and published in *Rapid Communications in Mass Spectrometry* (2003; 17: 1056-1 064), and U.S. Pat. No. 7,923,681, entitled "Collision Cell for Mass Spectrometer," which are hereby incorporated by reference in their entireties. Other configurations, including but not limited to those described herein and others known to those skilled in the art, can also be utilized in conjunction with the systems, devices, and methods disclosed herein. For instance, other suitable mass spectrometers may include single quadrupole, triple quadrupole, ToF, trap, and hybrid analyzers. It will further be appreciated that any number of additional elements can be included in the system 10 including, for example, an ion mobility spectrometer (e.g., a differential mobility spectrometer) that is disposed between the ionization chamber 12 and the mass analyzer 70 and is configured to separate ions based on their mobility through a drift gas in high- and low-fields rather than their mass-to-charge ratio). Additionally, it will be appreciated that the mass analyzer 70 may comprise a sensor that can detect the ions which pass through the analyzer 70 and may, for example, supply a signal indicative of the number of ions per second that are detected.

Figure 2:
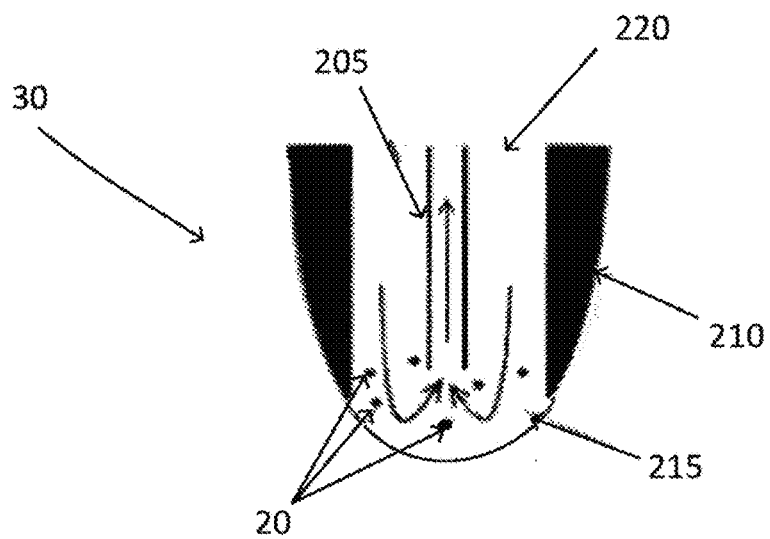
FIG. 2 is s schematic representation of a sampling probe used in embodiments.

The sampling probe 30 can have a variety of configurations but generally includes an open end by which the liquid delivered from the reservoir 50 is open to the atmosphere, thus exhibiting a liquid-air interface for capturing sample, as shown schematically in FIG. 2. In some embodiments, the sampling probe 30 can include a first cylindrical member 205 for exhausting liquid disposed within a second cylindrical member 210 for supplying liquid to the open end, the first cylindrical member 205 and the second cylindrical member 210 being arranged in a co-axial arrangement, and an open-ended tip 215 configured to receive molecules of a sample 20 containing or suspected of containing one or more analytes.

Figure 3:
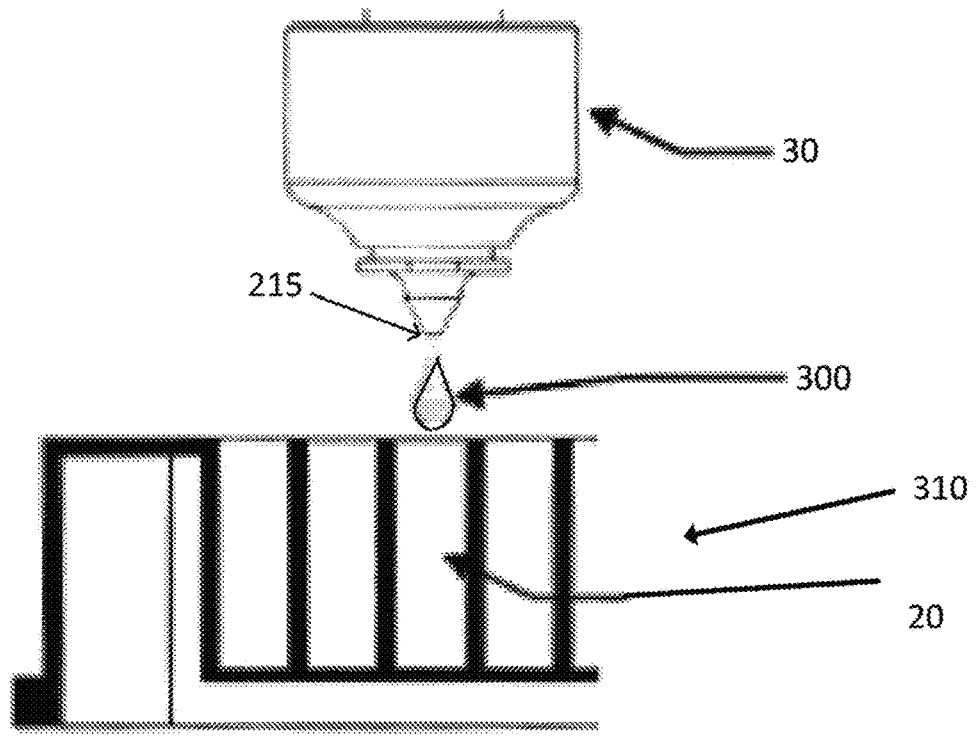
FIG. 3 shows formation of a liquid droplet at an open end of the sampling probe in FIG. 2.

In operation, samples 20 may be ejected, for instance acoustically ejected, from a sample vessel 310 (FIG. 3) into the open-ended tip 215 of sampling probe 30. Within the sampling probe 30, capture fluid (e.g. organic solvent) travels toward the tip end 215 through the annular space 220 between the two cylindrical members and then travels away from the tip end through the inner cylinder as depicted in the arrows in FIG. 2 defining the fluid path. The capture fluid and molecules of sample 20 flow from the tip end 215 to the ionization chamber 12, as discussed above.

By way of non-limiting example, in some embodiments the sample 20 may comprise a liquid sample that can be acoustically ejected from sample vessel 310, directly into the liquid present within the sample space at the tip end 215. It will likewise be appreciated by those skilled in the art, in light of the teachings herein that any liquid (e.g., solvent) suitable for directly receiving a liquid sample, for example, and amenable to the ionization process can be provided by the reservoir 50 in accordance with various aspects of the present teachings. In other embodiments, the sample may comprise a solid sample that may be introduced directly into the liquid present within the sample space for dissolution. In some embodiments, the solid sample can comprise solid phase substrates having binding affinity for a selected protein of a drug molecules, such as Solid Phase MicroExtraction (SPME) fibers or magnetic particles.

Returning to FIG. 3, the external physical structure of the sampling probe 30 is depicted, FIG. 2 being a schematic representation thereof. A liquid droplet 300 is shown forming at the open-ended tip 215 as a result of, for example, insufficient aspiration at the open the tip end 215. As discussed above, upon exceeding a certain weight liquid droplet 300 detaches itself from the sampling probe 30 and falls under gravitational force into the sample vessel 310 (e.g. a sample wellplate), thereby causing contamination of the sample 20. Experimentation by the inventors has shown that the viscosity characteristics of an organic solvent are such that it will "creep up" the tapered area of the sampling probe before it has enough weight to form a drop. Based on a 200 uL/min flow rate, droplet formation has been observed to occur in approximately 30 msec with an imbalance between solvent supply to the sampling probe 30 and exhausting of solvent by aspiration at the open end due to flow of nebulizing gas.

Figure 4:
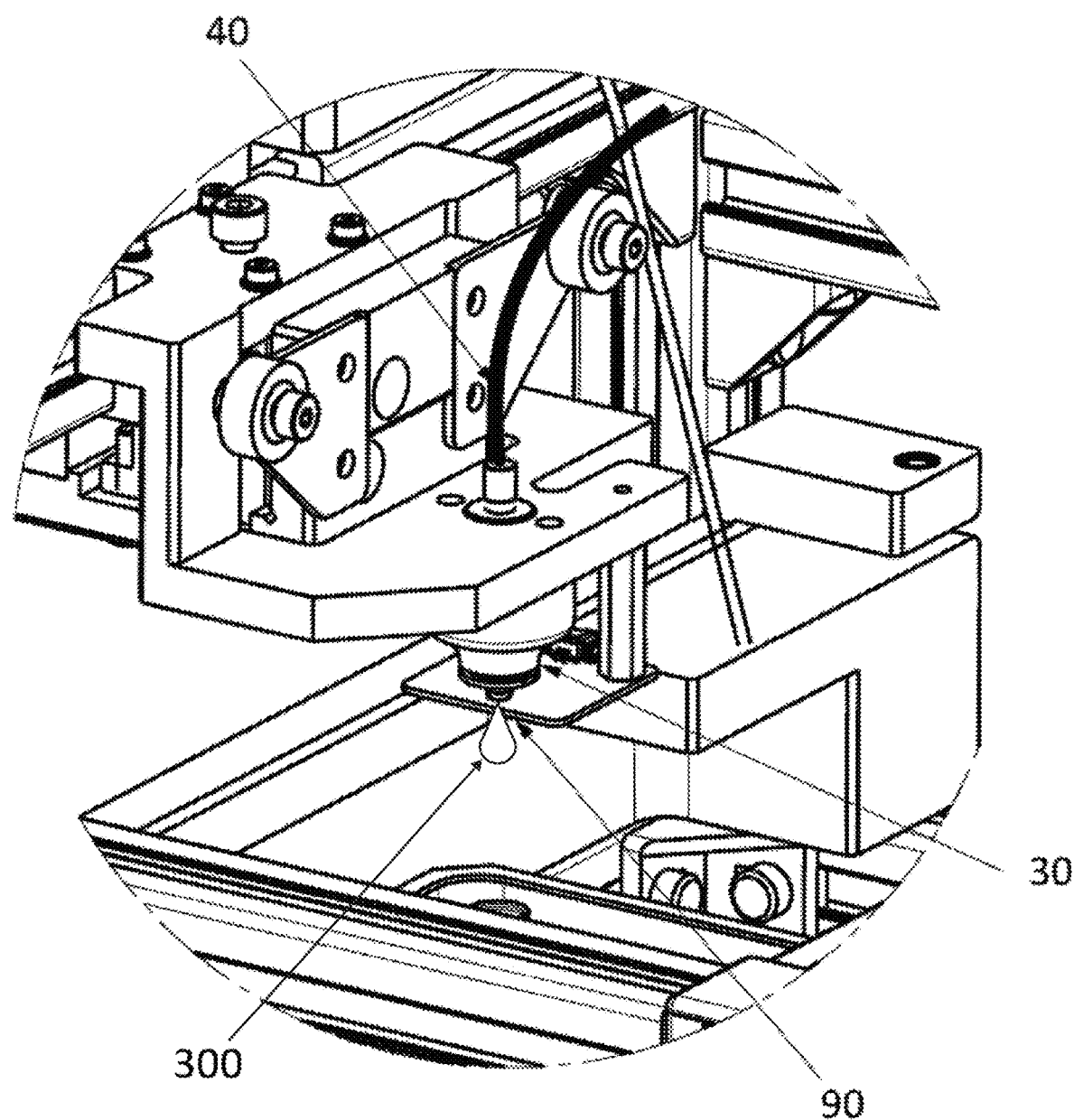
FIG. 4 shows an apparatus for detecting droplets of liquid as they form at the open end of the sampling probe in FIG. 3, according to an embodiment.
Figure 5:
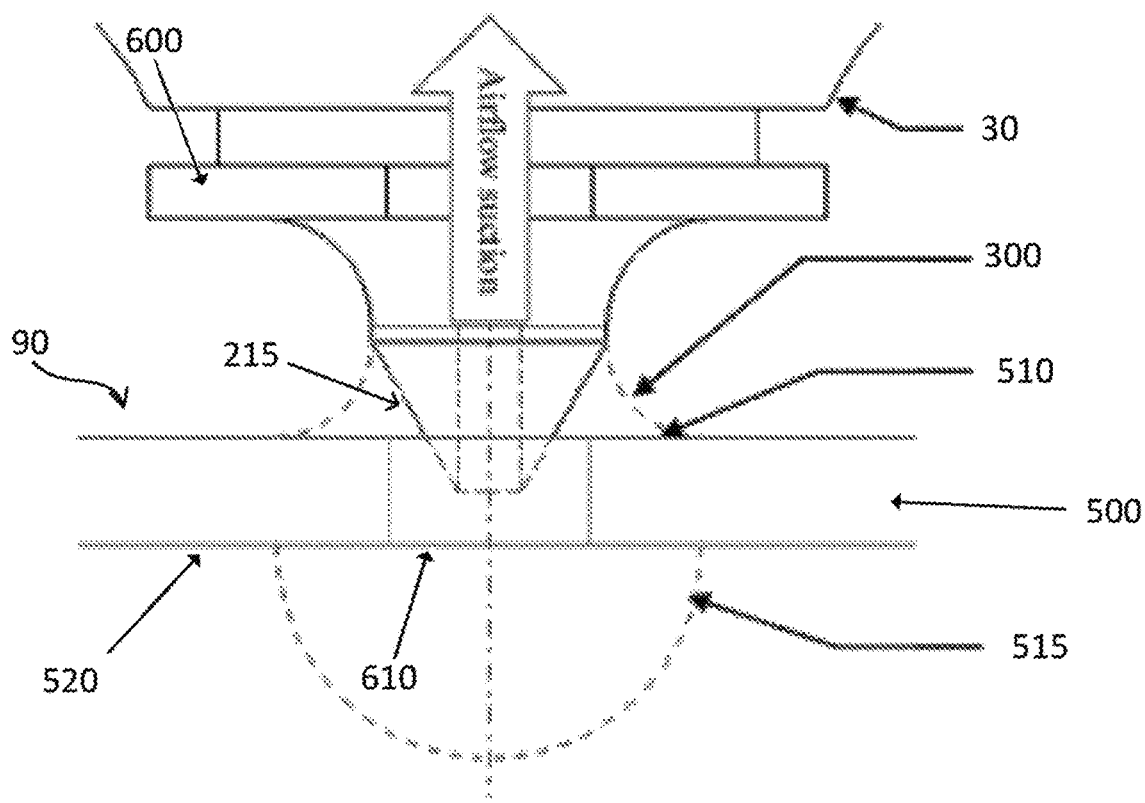
FIG. 5 depicts retention of a droplet of liquid at a lower surface of a substrate of the apparatus in FIG. 4, according to an embodiment.
Figure 6:
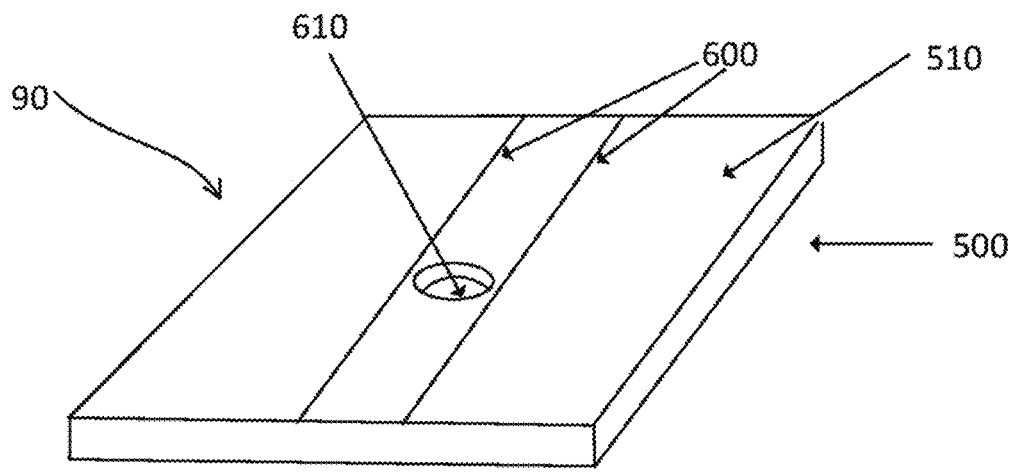
FIG. 6 is a detail of the substrate shown in FIG. 5, according to an embodiment.

Turning to FIGS. 4-6, according to an embodiment, apparatus 90 is shown comprising a substrate 500 adapted to retain the droplet 300 as it forms at the open end 215 of the sampling probe 30. In an embodiment, as shown in FIG. 6, the substrate 500 includes an orifice 610 located to accommodate the open end 215 of the sampling probe 30 and permit passage of sample into the open end 215. The orifice 610 adapted to accumulate the droplet 300 under tension, as shown at 515, as the droplet 300 grows from a lower surface 520 of the substrate (i.e. facing the sample 20) along the wall of the orifice toward an upper surface 510 of the substrate, whereupon the droplet comes into contact with a sensor 600 on the upper surface 510. In some embodiments, the sampling probe 30 protrudes into the orifice 610 past the upper surface 510 to place the open end 215 between the sample 20 and the sensor 600. In these embodiments sample ejected into the open end 215 is captured before passing the sensor 600, reducing the possibility of the sensor 600 interfering with the trajectory of the sample.

Sensor 600 is adapted to detect the accumulated droplet 300 of liquid and generate a signal to controller 80 for reducing or halting supply of liquid flow to the sampling probe 30, while continuing aspiration to exhaust the excess liquid form the open end 215. In this manner the droplet 300 is arrested and removed before it overflows into the sample. In some embodiments, controller 80 may be further operative to increase the flow of nebulizing gas to correspondingly increase aspiration at the open end. In some aspects, the controller 80 may be operative to maintain the liquid flow supply to the sampling probe 30 at a constant flow rate while increasing the flow of nebulizing gas to increase aspiration and accordingly aspirate the droplet 300 into the open end 215.

In embodiments, locating the sensor 600 on the top surface 510, away from incoming ejection droplets from sample vessel 310, reduces or eliminates interference by any electric field from sensor 600 to the sample ejection trajectory. Acoustically ejected nano droplets are quite sensitive to charge, and uncontrolled electrostatic charges are known to affect the volume and/or the trajectory of the droplets (e.g. see U.S. Pat. No. 7,070,260). In embodiments where the sensor 600 does not generate sufficient charge to affect acoustic ejection of sample droplets, the sensor 600 may be located in the orifice wall of the orifice 610 itself, as may be convenient.

Experiments have shown that apparatus 90 retains the overflowed solvent and prolongs the time taken for the actual liquid dripping into the sample to occur from about 30 msec to about 30 sec, which is sufficient time to halt the acquisition process and generate the notification signal for alerting human operators of the overflow condition and/or correct the problem by aspirating off the overflow liquid.

In other embodiments, the sensor 600 is one of either an electrically conductive trace or a conductive wire, located for instance on the upper surface 510, to detect a change in resistance upon contact with solvent, or a temperature sensor, such as a thermocouple or a resistance thermometer, to detect change in temperature when in contact with solvent. In other embodiments an accessory capillary tube may be located to aspirate the overflow liquid away from the sensor 600 before it drips into the sample.

Figure 7:
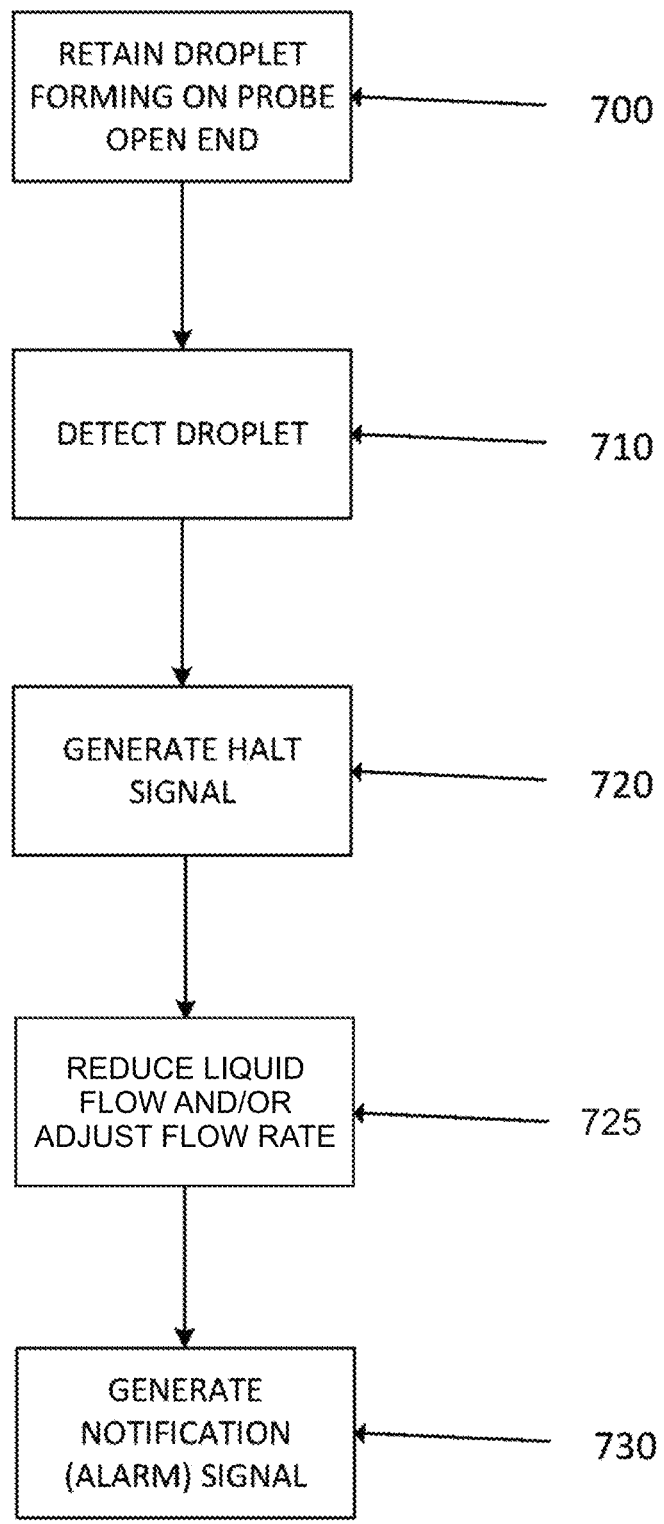
FIG. 7 depicts a method for preventing liquid overflow from a sampling probe into a sample, according to an embodiment.

In another aspect, as set forth in FIG. 7, a method is set forth for preventing liquid overflow from a sampling probe 30 into a sample 20. In an embodiment, the method comprises retaining a droplet 300 of liquid as it forms at an open end 215 of the sampling probe (700), detecting the retained droplet of liquid (710), and generating a signal (720) for reducing or halting liquid flow (725) supplied to the sampling probe 30 before the retained droplet overflows into the sample 20. In some embodiments, a notification signal may also be generated (730) indicating an overflow condition to a human operator. In some aspects, the method may comprise adjusting a flow rate of at least one of the solvent supply to control supply of fluid to the open end of the sampling probe 30 and/or a nebulizing gas flow rate to control the exhaust of fluid from the open end of the sampling probe 30.

In embodiments, the droplet 300 of liquid is detected on upper 510 surface opposite the sample 20. In another embodiment, retaining (700) the droplet 300 includes accumulating the droplet under tension as it grows from the bottom surface 520 of the substrate 500.

The many features and advantages of the invention are apparent from the detailed specification and, thus, it is intended by the appended claims to cover all such features and advantages of the invention that fall within the scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. Apparatus for preventing liquid overflow from a sampling probe into a sample, comprising:
 a substrate adapted to retain a droplet of liquid as it forms at an open end of the sampling probe; and
 a sensor on a surface of the substrate opposite the sample adapted to detect the retained droplet of liquid and generate a signal to control the droplet of liquid before it overflows into the sample.

2. The apparatus of claim 1, wherein the droplet of liquid is controlled by at least one of:
 halting a supply of liquid to the sampling probe;
 increasing aspiration at the sampling probe to aspirate the droplet of liquid from the substrate;
 reducing the supply of liquid to the sampling probe; and,
 a combination of increasing aspiration and reducing or halting the supply of liquid to the sampling probe.

3. The apparatus of claim 1, wherein the substrate includes an orifice adapted to accumulate and retain the droplet under tension as it grows from a surface of the substrate facing the sample toward the surface of the substrate opposite the sample, whereupon the droplet comes into contact with the sensor for detection thereby.

4. The apparatus of claim 1, wherein the sensor is an electrically conductive trace on the surface of the substrate opposite the sample.

5. The apparatus of claim 1, wherein the sensor is a conductive wire on the surface of the substrate opposite the sample.

6. The apparatus of claim 1, wherein the sensor is a temperature sensor on the surface of the substrate opposite the sample.

7. The apparatus of claim 6, wherein the temperature sensor is a thermocouple.

8. The apparatus of claim 6, wherein the temperature sensor is a resistance thermometer.

9. A method for preventing liquid overflow from a sampling probe into a sample, comprising:
 retaining a droplet of liquid as it forms at an open end of the sampling probe;
 detecting the retained droplet of liquid; and
 generating a signal, based on the detecting of the retained droplet of liquid, for controlling the droplet of liquid before it overflows into the sample.

10. The method of claim 9, wherein the controlling the droplet of liquid comprises at least one of:
 halting a supply of liquid to the sampling probe;
 increasing aspiration at the sampling probe to aspirate the droplet of liquid from the substrate;
 reducing the supply of liquid to the sampling probe; and,
 a combination of increasing aspiration and reducing or halting the supply of liquid to the sampling probe.

11. The method of claim 9, wherein the droplet of liquid is detected on a substrate surface opposite the sample.

12. The method of claim 11, wherein retaining a droplet of liquid includes accumulating the droplet under tension as it grows from a substrate surface facing the sample toward the substrate surface opposite the sample.

13. The method of claim 9, further comprising generating a notification signal indicating an overflow condition.

* * * * *